2,749,269

FUNGICIDAL COMPOSITIONS COMPRISING ESTERS OF N-NAPHTHYL HALO-MALE-AMIC ACIDS AND METHODS OF APPLYING

Waldo B. Ligett, Pontiac, Mich., Calvin N. Wolf, New York, N. Y., and Rex D. Closson, Detroit, Mich., assignors to Ethyl Corporation, New York, N. Y., a corporation of Delaware No Drawing. Application December 17, 1953, Serial No. 398,879

5 Claims. (Cl. 167—30)

This invention relates to novel fungitoxic compositions. In particular, this invention relates to the protection of materials susceptible to fungus attack by incorporating therewith or applying thereto certain halogenated maleamic acid materials. Our invention also relates to methods of formulating such compounds into useful fungicides and methods of their application.

By the term "fungicide" is meant to include not only the property of destroying fungi but also the property of inhibiting the germination of the spores, or the sporulation, of the fungi, a property sometimes also referred to as fungistatic or fungitoxic.

It is an object of this invention to provide materials, and compositions and formulations thereof, which are effective in preventing fungicidal attack. It is a further object of this invention to provide compositions which can be applied to materials normally susceptible to attack by fungus organisms and which prevent such attack. It is a further object of this invention to provide a group of organic materials which provides such protection against a diversity of fungus organisms and under a diversity of conditions of use and to a diversity of materials and in a diversity of media. A specific object is to provide compositions which can be applied to industrial materials normally susceptible to attack by fungus organisms and which prevent such attack.

The present invention comprises providing new fungicidal compositions comprising a relatively inert fungicidal adjuvant as a carrier, and as a principal active ingredient, a compound of the formula

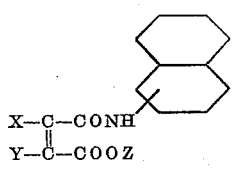

wherein X and Y are selected from the group consisting of hydrogen and halogen and at least one of X and Y is halogen, and wherein Z is selected from the class consisting of hydrogen and lower alkyl radicals. Thus, the active ingredients of the present invention can be described as halogenated N-naphthylmaleamic acids and lower alkyl esters of halogenated N-naphthylmaleamic acids. The naphthyl radical can be either alpha or beta. The present invention also contemplates applying formulations of the type described above to materials susceptible to fungus attack and therefore provides a method of combating fungi which comprises treating materials susceptible to attack by fungus organisms with compounds of the type above described. Preferably employed lower alkyl esters are those whose alkyl group contains from 1 to about 12 carbon atoms; that is, methyl, ethyl, propyl, isopropyl, butyl, isobutyl, sec-butyl, tert-butyl, any of the isomeric hexyl, heptyl, octyl, nonyl, decyl, undecyl, and dodecyl radicals. From solubility considerations the esters in which the alcohol portion contains 1 to 5 carbon atoms are usually particularly preferred.

In the following examples of methods which have been employed in preparing typical representatives of the active ingredients of the present invention, all parts and percentages are by weight.

EXAMPLE I

N-(α-naphthyl)-α-chloromaleamic acid

To a solution of 50 parts of α-chloromaleic anhydride in 132 parts of benzene was added, with stirring, a solution of 54 parts of α-naphthylamine in 132 parts of benzene. Reaction took place immediately at room temperature with deposition of the product as a yellow solid. This solid was filtered, washed with benzene, and air dried to yield quantitatively α-chloro-N-(α-naphthyl)-maleamic acid as a fine yellow powder having a melting point of 142–143° C.

EXAMPLE II

Methyl α-chloro-N-(α-naphthyl)maleamate

Sodium α-chloro-N-(α-naphthyl)maleamate was prepared by treating a suspension of 48.2 parts of α-chloro-N-(α-naphthyl)maleamic acid in 250 parts of water with 8 parts of sodium hydroxide. To the resultant reaction mixture was added slowly with stirring, a solution of 34 parts of silver nitrate in 150 parts of water, the temperature of addition being controlled to 0–5° C. After addition was complete the reaction mixture was stirred for 15 minutes, after which silver α-chloro-N-(α-naphthyl)maleamate was filtered, washed with cold water and ethanol, and air dried.

The dried silver salt was then suspended in 250 parts of anhydrous diethyl ether and 14.2 parts of methyl iodide added with vigorous agitation over a period of 15 minutes at room temperature. The reaction mixture was then stirred for 2 hours longer, after which the silver iodide formed in the reaction was removed by filtration. The ether solution was washed with dilute sodium bicarbonate solution and with water. After drying over anhydrous calcium sulfate the ether and excess methyl iodide were removed by vacuum distillation and the residue from the distillation recrystallized from anhydrous diethyl ether. Forty parts (78.5 per cent) of methyl α-chloro-N-(α-naphthyl)maleamate was obtained as white crystals melting at 83–85° C.

EXAMPLE III n-Butyl α-chloro-N-(α-naphthyl)maleamate

This compound was prepared in 40.3 per cent yield by the procedure of Example II except that an equivalent amount of n-butyl iodide was used in place of methyl iodide. The butyl ester so obtained was in the form of tan crystals melting at 31–35° C.

We have determined that the various embodiments of our active ingredients are effective fungicides against a wide variety of fungus organisms. Although there is a measurable difference in the rate at which our fungicides attack various fungus organisms, this can be readily determined by test. This difference is a matter of degree, and, providing that sufficient amount of fungicide is applied, protection is obtained against a wide variety of fungus organisms.

In order to obtain practical benefit from the inherent fungicidal activity of the above defined active ingredients, we employ our compounds as formulations with relatively inert surface-active agents. In the pure state the above compounds may be too effective or too potent in some applications to have practical utility as fungitoxicants. For example, in order to protect most effectively a surface such as a painted or wood surface or other surface, it is preferred to apply our materials in intimate contact but thoroughly dispersed on the surface thereof. Likewise, in treating more or less porous material, such as cloth, felted textiles, and woven fibers, it is important that our materials be interspersed between the fine structure of such materials and be in intimate contact therewith. Therefore, in order to benefit from our discovery that the defined materials are effective fungicides, we incorporate therewith a relatively inert surface-active agent or adjuvant as a dispersing medium. Furthermore, such adjuvants have the effect of requiring only minute quantities of the above defined compounds in some formulations to obtain effective protection. A further advantage of so extending these materials is to permit field application by methods readily employed and still obtain effectively complete coverage of the material being protected.

The formulations of this invention, therefore, comprise the hereinabove defined fungitoxic active ingredients and a suitable material as an adjuvant therefor. It is not intended that this invention be limited to any specific proportions of active ingredient and adjuvant. The important feature of the invention is to provide an adjuvant such that upon the preparation of a formulation of such concentration as appropriate for application, the adjuvant will be present to provide the proper type of contact with the material being protected. Thus, in one embodiment the adjuvant can comprise a surface-active agent such as a detergent, a soap, or other wetting agent. Such a formulation then comprises the active ingredient in combination with a minor proportion of the surface-active agent or adjuvant. Such a formulation is of practical merit because of its concentrated form and ease of transportation, storage, and the like. Such a formulation lends itself directly to further dilution with the carrier without resorting to complicated mixing, blending, and grinding procedures. Thus, such a formulation can be further diluted with a solid carrier of the dust type by a simple mixing operation. Likewise, such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier or a wettable powder which upon admixture with water prior to application forms a dispersion of the active ingredient and the solid carrier in water.

It is also intended that the term "adjuvant" include solid carriers of the type of talc, pyrophyllite, atticlay, kieselguhr, chalk, diatomaceous earth, and the like; and various mineral powders, such as calcium carbonate and the like, which act as a dispersant, as a carrier, and in some instances perform the function of a surface-active agent.

An important utility of the active ingredients of this invention is their ability to prevent fungus, mildew, or mold attack in various industrial applications. Typical of such applications include incorporating these fungicidal active ingredients in paints wherein certain ingredients of the paint provide the adjuvant action referred to above. Other surface coatings containing these active ingredients are resistant to mildew which may occur on the outside of a surface treated with such surface coatings. Similarly, these active ingredients are effective in protecting so-called emulsion type paints, which comprise a water emulsion of an oil, pigment, and coating vehicle. Upon standing exposed to atmospheric conditions, such paints in the container are subject to fungicidal attack, resulting in a breaking of emulsion and rendering the paint generally unfit for use. Other examples of applications of the active ingredients of this invention include fabric mildew-proofing; prevention of sap stain and mold on lumber; protection of plastics, in particular vinyl type plastics; preservatives for paper to prevent slime mold, in particular for cardboard containers subjected to high temperature and high humidity; and as a preservative for leather to prevent attack thereon by mildewing. In the above and other instances, wherein these active ingredients are effective preservatives, the feature of providing therewith an adjuvant is important to producing the greatest level of protection. Such adjuvants may be introduced as a preformed formulation with the fungitoxicant or can be present as an ingredient of the material being protected.

One method of applying these fungicides is in the form of a water suspension. However, to obtain a fungicidally active aqueous suspension, we employ a surface-active agent in sufficient amount to disperse and suspend the fungicidal agent. Examples of such surface-active agents can be employed in forming dispersions include salts of the alkyl and alkylaryl sulfonates, such as du Pont MP–189 and Nacconol-NR, a sodium salt; alkyl sulfates, such as Dreft; alkylamide sulfonates, including fatty methyl taurides such as Igepon-T; the alkylaryl polyether alcohols, such as Triton X–100; the fatty acid esters of polyhydric alcohols, such as Span; the ethylene oxide addition products of such esters, as for example Tween, a hexitol product; and the addition products of long-chain mercaptans and ethylene oxide, such as Sharples' Non-Ionic–218. Still other surface-active agents can be employed, the above merely showing a representative list of the more common materials.

In the examples which follow all parts are parts by weight.

EXAMPLE IV

Methyl N-(β-naphthyl)-α-chloromaleamate

A formulation of methyl N-(β-naphthyl)-α-chloromaleamate is prepared by finely grinding 10 parts of this material and adding the resulting powder to 1000 parts of water containing one part of Tween–80 with vigorous agitation. This concentrated dispersion is further diluted 1000 times by the addition of water to obtain a formulation of suitable concentration for application. Thus, the resulting dispersion contains 10 p. p. m. of our fungicide in the water dispersion.

We can prepare in a similar manner aqueous dispersions at concentrations of 0.1, 1.0, 10, and 100 p. p. m. of the following fungicides of our invention: ethyl N-(α-naphthyl)-α-chloromaleamate, N-(α-naphthyl)-α-chloromaleamic acid, N-(α-naphthyl)-α,α-dichloromaleamic acid, methyl N-(β-naphthyl)-α-bromomaleamate, methyl N-(α-naphthyl)-α,α'-dibromomaleamate, methyl N-(α-naphthyl)-α,α'-dichloromaleamate, n-butyl N-(α-naphthyl)-α-chloromaleamate, octyl N-(α-naphthyl)-α,α'-dibromomaleamate, and dodecyl N-(α-naphthyl)-α,α'-dichloromaleamate.

The solubility of the active ingredients of this invention in organic solvents, furthermore, is such that they can be applied advantageously in the form of solutions in this type of solvent, and for certain uses this method of application is preferred. For example, in treating cloth, leather, or other fibrous articles, it is preferred to apply the fungicides dissolved in a volatile solvent. After use the volatile solvent evaporates, leaving the fungicidal agent impregnated throughout the surface of the article and in the dispersed form which has been found to be most advantageous. Likewise, in applying the fungicides to smooth surfaces, as, for example, in treating wood surfaces for protection against fungus attack such as mildew and sap stain, or to inhibit fungus growths on damp concrete surfaces, a solution may be the most practical method for applying a protective film by brushing, spraying, or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for the fungicides, we use hydrocarbons, such as benzene, xylene, or toluene; ketones, such as acetone, methylethyl ketone, and cyclohexanone; chlorinated solvents, such as carbon tetrachloride, trichloro- and perchloroethylene; esters, such as ethyl, butyl, and amyl acetates; and alcohols, such as ethanol, isopropanol, and amyl alcohols. Other solvents which are employed are the carbitols and cellosolves, the former comprising in general the monoalkyl ethers of diethylene glycol, and the latter, the monoalkyl ethers of ethylene glycol. In addition, combinations of these various typical solvents can be employed whereby special volatility and viscosity characteristics can be imparted to the formulations.

EXAMPLE V

*Dodecyl N-(α-naphthyl)-α,α'-dichloromaleamate*

A solution consisting of 5 parts of dodecyl N-(α-naphthyl)-α,α'-dichloromaleamate in 250 parts of cyclohexanone is prepared by stirring the two constituents for a period of 15 minutes at a temperature of about 25° C. This concentrated solution, suitable for storage or transportation, is further diluted with 99,750 parts of kerosene to form a final dilution of 50 p. p. m. suitable for application.

Similarly, concentrated solutions of isopropyl N-(α-naphthyl)-α-bromomaleamate, N-(α-naphthyl)-α-chloromaleamic acid, N-(α-naphthyl)-α,α-dichloromaleamic acid, nonyl N - (α-naphthyl) - α,α' - dichloromaleamate, methyl N-(α-naphthyl)-α-chloromaleamate, and the like are prepared in each of the following solvents: ethyl acetate, kerosene, perchloroethylene, and cellosolve; and final dilutions for application are prepared by the addition of further quantities of kerosene with equally good results.

The preferred formulation of the active ingredient fungicides of this invention comprises a wettable powder. In preparing wettable powders several formulation procedures are possible. Thus, it is one intention of this invention to provide compositions comprising the active ingredients defined herein in combination with a minor amount of a surface-active agent. Such surface-active agent can be chosen, for example, from among the following; alkyl and alkaryl sulfonates, such as du Pont MP–189 and Nacconol-NR; alkyl sulfates, such as Dreft; alkylamide sulfonates, such as Igepon-T; the alkylaryl polyether alcohols, such as Triton X–100; the fatty acid esters of polyhydric alcohols, such as Span; the ethylene oxide addition products of such esters, as for example Tween; and the addition products of long-chain mercaptans and ethylene oxide, such as Sharples' Non-Ionic-218. Still other surface-active agents can be employed, the above merely showing a representative list of the more common materials. Employing such formulated materials can thus comprise the simple admixture with a dust carrier. Such formulations then comprise the active ingredients of this invention, a surface-active agent, and the inert carrier. Among the inert carriers which can be employed in thus preparing wettable powders are, for example, soybean flour, tobacco flour, walnut shell flour, wood flour, sulfur, tripolite, diatomite, calcium lime, magnesium lime, calcite, dalomite, gypsum, mica, talc, pyrophyllite, montmorillonite, kaolinite, attapulgite, apatite, and pumice. In preparing such concentrated wettable powders it is preferred to employ between about 0.1 and 5 per cent of the surface-active agent based upon the amount of active ingredients, and from 25 to 85 per cent of the inert carrier based upon the total amount of the formulation. Such formulations provide the advantage of permitting storage and transportation of the fungitoxicant and permit further dilution by simple admixture with water at the time of application. Thus, within the scope of this invention is also contemplated finished formulations for direct application comprising the fungitoxicant as defined herein, surface-active agents as illustrated above, and inert solid carriers as likewise illustrated above, all suspended in water. Such finished formulations, depending upon the application in mind, can include between about 0.1 to 10,000 p. p. m. of active ingredient. A preferred range for agricultural application is between 0.1 and 2,000 p. p. m. Typical formulations of such wettable powders of this invention are illustrated in the following examples, wherein the active ingredients of this invention are employed as the fungitoxicant. Similar formulations can readily be prepared from the other fungitoxicants of this invention.

EXAMPLE VI

*N-(α-naphthyl)-α-chloromaleamic acid*

A mixture of 100 parts of N-(α-naphthyl)-α-chloromaleamic acid, 1000 parts of attaclay, and 0.1 part of Nacconol is milled through a hammer mill and the resulting powder sieved to pass a 100-mesh screen. This 10 per cent wettable powder produces a satisfactory water suspension when 11 parts are stirred into 10,000 parts of water to produce a suspension containing 100 p. p. m. active ingredient.

Similar wettable powders are prepared by milling N-(α-naphthyl)-α-bromomaleamic acid, N-(α-naphthyl)-α,α-dichloromaleamic acid, ethyl N-(α-naphthyl)-α-bromomaleamate, n-amyl N-(α-naphthyl)-α,α'-dichloromaleamate, octyl N-(α-naphthyl)-α,α'-dibromomaleamate, with a carrier and a surface-active agent.

In addition to the above described methods of wet application of the active ingredients of this invention, compositions can be prepared in which the materials are extended in talc, clay, or other solid diluents. Such carriers perform the adjuvant function as contact agents. Further specific examples of such typical inert solid carriers which can be employed as diluents in the dust formulations include fuller's earth, pyrophillite, attaclay, and the Filtrols.

EXAMPLE VII

*n-Butyl N-(β-naphthyl)-α-bromomaleamate*

A dust formulation of one of the fungicides is prepared as follows: One part of n-butyl N-(β-naphthyl)-α-bromomaleamate is placed in a ball mill with 100 parts of fuller's earth. This mixture is milled for a period of one hour and screened to collect a fraction passing a 100-mesh sieve. This one per cent by weight formulation can be applied directly or further diluted. A further dilution is made by repeating the above procedure with an additional 9,900 parts of fuller's earth.

Similar dust formulations are prepared from the following compounds: N-(α-naphthyl)α,α' - dibromomaleamic acid, methyl N-(α-naphthyl)-α,α'-dichloromaleamate, decyl N-(α-naphthyl) - α - bromomaleamate, and dodecyl N-(α-naphthyl)-α,α'-dichloromaleamate by treating them in a ball mill as above with Filtrol with substantially identical results.

For certain applications it is preferred to employ the fungicides in the form of oil-in-water emulsions. Thus, a concentrate of the fungicidal agent is prepared in a water-insoluble solvent, and this solution is then dispersed or emulsified in water containing a surface-active agent. Typical examples of such solvents include hydrocarbons, such as kerosene, benzene, or naphtha; higher alcohols, such as butanol, oleyl alcohol, or ethers and esters thereof; and chlorinated solvents, such as perchloroethylene and trichloroethylene.

EXAMPLE VIII

*Hexyl N-(β-naphthyl)-α-chloromaleamate*

An oil-in-water emulsion is prepared by dissolving 10 parts of hexyl N-(β-naphthyl) - α - chloromaleamate in 1000 parts of kerosene. This solution is dispersed with vigorous agitation in 99,000 parts of water containing 1 part of Triton X-100 to provide a dispersion containing 10 p. p. m. of active agent. When similar solutions of N-(α-naphthyl)-α-bromomaleamic acid, methyl N-(α-naphthyl)-α-chloromaleamate, sec-butyl N-(α-naphthyl)-

α,α'-dibromomaleamate, and dodecyl N-(β-naphthyl)-α-chloromaleamate are prepared in kerosene, naphtha, and trichloroethylene, followed by dispersion in water, equally satisfactory emulsions are obtained.

In adidtion, we have found that we can incorporate an adherent or sticking agent, such as vegetable oils, naturally occurring gums, and other adhesives, in our active ingredient formulations. Likewise, we can employ humectants in our formulations. Furthermore, these formulations can be employed in admixture with other fungicidal materials or other biocides, such as insecticides, larvicides, bactericides, vermicides, miticides, or with other materials which it is desired to apply along with our fungicide.

We have illustrated the utility of our fungicides as fungitoxic materials by determining the concentration at which the germination of 50 per cent of the spores of each of the fungi *Alternaria oleracea* and *Sclerotinia fructicola* is inhibited. These fungi are representative of fungus types which are responsible for heavy economic damage. The ability to control these fungi is a reliable indication of the general applicability of our fungicides.

The standard procedure for determining the above referred to effectiveness comprises dissolving the material to be applied in ten times its weight of acetone containing one-tenth its weight the amount of a surface-active agent, Triton X–155. This solution is thereupon diluted to the indicated concentration with distilled water. This suspension at various dilutions with distilled water was applied to a drop of water containing the test organisms on a microscope slide. The concentration was thereby determined at which one-half of the fungi were prevented from sporulating. This standard slide-germination method is described and accepted by the Committee on Standardization of Fungicidal Tests of the American Phytopathologocial Society in "Phytopathology," 33, 627 (1943). In such a test the concentration of three typical compounds of our invention necessary to inhibit sporulation by 50 per cent (ED$_{50}$) of *Alternaria oleracea* were: for N-(α-naphthyl)-α-chloromaleamic acid, 1–10 p. p. m.; for methyl N-(α-naphthyl)-α-chloromaleamate, 0.1–1 p. p. m.; and for n-butyl N-(α-naphthyl)-α-chloromaleamate, 0.1–1. The concentrations of the same ingredients necessary to inhibit sporulation by 50 per cent of *Sclerotinia fructicola* was 1–10 p. p. m. The other compounds of this invention possess similar efficient fungicidal properties.

In general the fungicidal compositions are effective over a wide range of concentrations of the fungicidal active ingredients of this invention. Thus, at concentrations as high as 10,000 p. p. m. we obtain effective fungicides, and at concentrations as low as 0.1 p. p. m. we obtain protection. Furthermore, we can employ still higher concentrations for certain applications to inanimate objects and can formulate higher concentrations which are stable for storage or handling. In general, however, we prefer the range of 0.1 to 10,000 p. p. m. for effective fungicidal use.

In addition to acting as a protective fungicide by killing or preventing sporulation, active ingredients as defined herein, when properly formulated, have an eradicant property. By this it is meant that on application to industrial commodities the formulation will destroy or prevent further increase of fungus colonies already in active growth.

In addition to the formulations whose fungicidal effect is illustrated above, it is to be understood that other formulations of our active materials likewise are very effective agents against fungi. This includes, for example, formulations of the type described in Examples IV, V, VI, VII, and VIII, as well as others. The above and other formulations of the fungicides of this invention ordinarily possess maximum effectiveness when a surface-active agent is incorporated therein. This includes even the organic solution formulation typified by Example V, as addition of a surface-active agent thereto not only enhances the wetting power of the formulation but also leads to a more versatile material if the solvent is removed by evaporation. In fact, an important aspect of the present invention comprises formulations in which an organic fungicide of the type herein disclosed is admixed with a surface-active agent as illustrated by the following example.

EXAMPLE IX

A formulation is prepared by intimately mixing one part of Span, which is a surface-active agent prepared by partly esterifying hexitol anhydrides with long-chain fatty acids, with 100 parts of n-propyl α-chloro-(N-β-naphthyl)maleamate. In this manner a valuable formulation is obtained which can be used in the further preparation of dusts, dispersions, solutions, and the like, or, if desired, can be applied as such to the material to be treated.

Formulations prepared by the use of this surface-active agent with other esters of the present invention are of similar effectiveness as are formulations prepared with other surface-active agents.

We claim:

1. Fungicidal compositions comprising a relatively inert fungicidal adjuvant as a carrier and as a principal active ingredient a halogenated compound of the formula

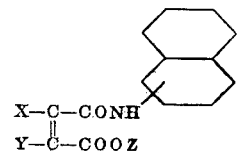

wherein X and Y are selected from the group consisting of hydrogen and halogen and at least one of X and Y is halogen, and wherein Z is selected from the class consisting of hydrogen and lower alkyl radicals.

2. The composition of claim 1 in which said ester is methyl N-(α-naphthyl)-α-chloromaleamate.

3. The composition of claim 1 in which said adjuvant is a surface-active agent.

4. A method of combating fungi which comprises treating materials susceptible to attack by fungus organisms with a halogenated compound of the formula

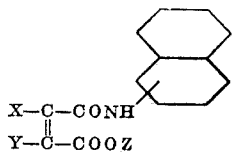

wherein X and Y are selected from the group consisting of hydrogen and halogen and at least one of X and Y is halogen, and wherein Z is selected from the class consisting of hydrogen and lower alkyl radicals.

5. The method of protecting materials susceptible to fungus attack which comprises applying thereto a formulation wherein a principal active ingredient is a halogenated compound of the formula

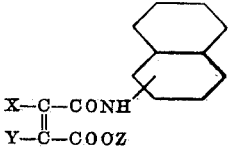

wherein X and Y are selected from the group consisting of hydrogen and halogen and at least one of X and Y is halogen, and wherein Z is selected from the class consisting of hydrogen and lower alkyl radicals.

References Cited in the file of this patent

UNITED STATES PATENTS 2,663,665    Ligett et al. _____ Dec. 22, 1953